July 25, 1944.                A. SCHUSTERMAN                2,354,405
          LIGHT TRAP FOR REMOVABLE REFLECTOR FILTERS
             FOR ONE SHOT MULTICOLOR PLATE CAMERAS
                    Filed Oct. 10, 1941          2 Sheets-Sheet 1
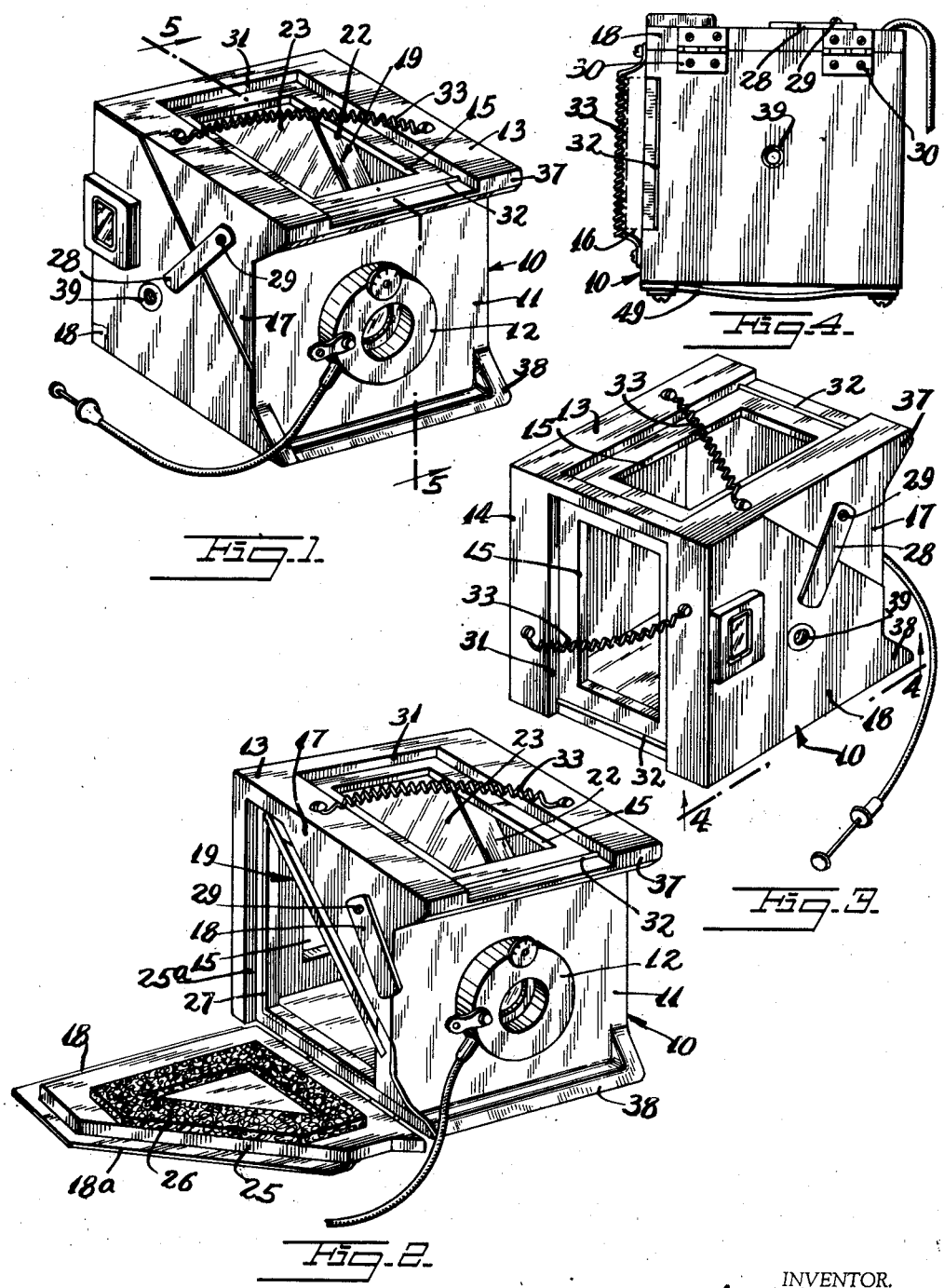
INVENTOR.
Adolph Schusterman
BY
Zoltan Holachek
ATTORNEY INVENTOR.
Adolph Schusterman
BY
ATTORNEY Patented July 25, 1944

2,354,405

UNITED STATES PATENT OFFICE 2,354,405

LIGHT TRAP FOR REMOVABLE REFLECTOR FILTERS FOR ONE-SHOT MULTICOLOR PLATE CAMERAS

Adolph Schusterman, New York, N. Y.

Application October 10, 1941, Serial No. 414,390

3 Claims. (Cl. 95—2)

This invention relates to new and useful improvements in a light trap for a removable reflector filter for a one shot multi-color plate camera.

More specifically, the invention contemplates the construction in a camera which will permit an easy removal of the reflector filter thereof and which is so constructed as to effectively prevent leakage of light into the camera.

More specifically, the invention proposes to construct the housing of the camera in the shape of a box having a front wall for supporting the lens and shutter mechanism, top and back walls with window openings for plate or film holders, and a side wall provided with a door to expose the removable reflector filter of the camera. A certain light trap is proposed in conjunction with the said door so as to prevent leakage of light into the camera when the door is closed.

It is proposed to characterize the light trap mentioned in the previous paragraph by the fact that it includes shoulders formed on said door around the edge portions thereof and cooperative with complementary shoulders on the housing, and certain felt strips mounted on the inner face of the door and cooperative with shoulders of the side wall of the housing.

Still further the invention proposes to construct the front wall of the camera housing with top and bottom extensions to shield the lens and shutter of the camera.

Still further the invention proposes certain sealing projections cooperative with the plate or film holders to assist in light proofing the camera.

Another object of the invention resides in a modification of the light trap by which the felt strips may be engaged against the cooperative shoulders under pressure to further insure a light proof arrangement.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a camera constructed in accordance with this invention and illustrated with the plate or film holders removed.

Fig. 2 is a perspective view similar to Fig. 1 but illustrated with the side door open.

Fig. 3 is a perspective view of the camera shown in Fig. 1 but viewed from the rear.

Fig. 4 is a bottom view looking in the direction of the line 4—4 of Fig. 3.

Figure 5:
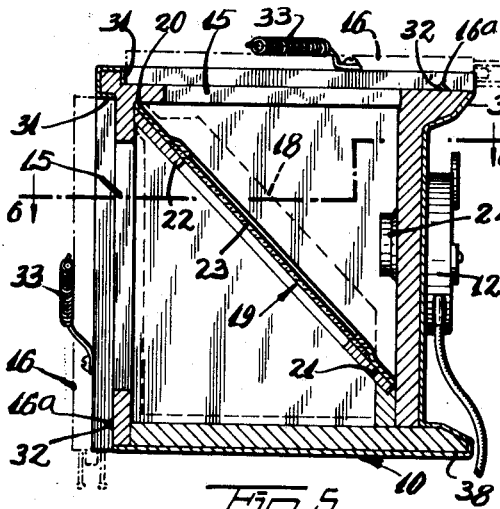
Fig. 5 is a vertical sectional view taken on the line 5—5 of Fig. 1.

The light trap for a removable reflector filter for a one shot multi-color plate or cut film camera, in accordance with this invention, includes a box shaped housing 10 having a front wall 11 upon which the lens and shutter mechanism 12 is mounted. The housing 10 is also provided with a top wall 13 and a back wall 14 which have window openings 15 for a plate or cut film holder, indicated by the dot and dash lines 16 in Fig. 5. The housing 10 is also provided with a side wall 17 having a door 18 to expose the reflector filter 19 of the camera. This reflector filter is located on a diagonal, as clearly shown in Figs. 2 and 5, and is supported by resting against the top and back corner 20 of the housing and a front bottom support 21. The construction is such that the reflector filter 19 may be slipped out from the side of the camera when the door 18 is open.

The reflector filter 19 comprises a frame 22 supporting a reflector filter 23 of a pre-selected color and is made of any reflecting transmitting substance or surface. For example, this reflector filter may be red. A green filter 24 is used in combination with the red reflector filter 19. This green filter 24 is mounted upon the inner portion of the front wall 11 of the housing directly behind the lens shutter mechanism 12.

Shoulders 25 are formed upon the door 18 around the edge portions thereof and are cooperative with complementary shoulders 25ª formed upon the edge portions of the side walls 17 which surround the door 18 when closed. Felt strips 26 preferably of black felt, are mounted on the inner face of the door 18 and are cooperative with shoulders 27 mounted upon the side wall 17 around the opening for the door. The door 18 has one of its sides 18ª cut at an angle so as to extend along the side of the removable reflector filter 19.

Figure 6:
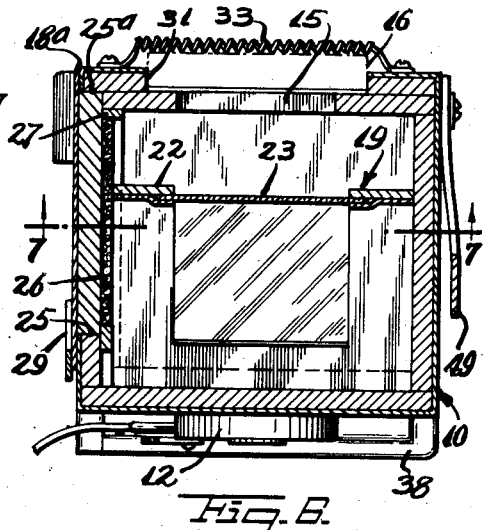
Fig. 6 is a horizontal sectional view taken on the line 6—6 of Fig. 5.
Figure 7:
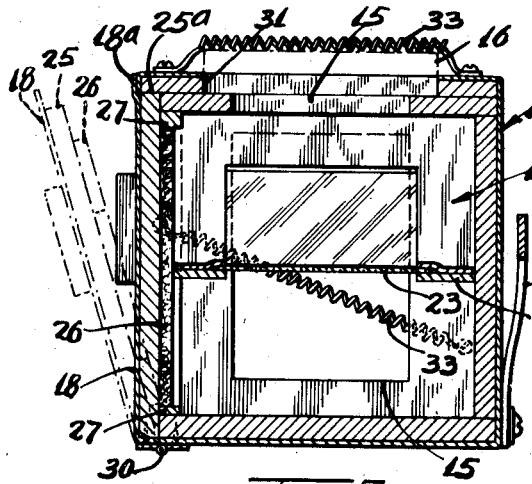
Fig. 7 is a sectional view taken on the line 7—7 of Fig. 6.

A side portion of the felt strips 26 is located along this side portion of the door so as to extend against the side edge of the reflector filter 19, as clearly shown, for example in Figs. 6 and 7. A latch 28 is mounted on the side wall 17 and is capable of holding the door 18 in its closed position. This latch comprises a spring strip pivotally supported by a pintle screw 29 and capable of assuming a position over the side of the door, as shown in Figs. 1 and 3, or a position out of contact with the door, as shown in Fig. 2. The door 18 is hingedly supported at its bottom side by the hinges 30.

The window openings 15 are surrounded by recessed shoulders 31 which are adapted to receive the sides of the plate or cut film holder 16, as indicated in Fig. 5. The shoulders 31 extend across one end and two sides of the window opening. The other end of each window opening is provided with a wedge shaped sealing strip 32 adapted to engage a complementary groove 16a formed across one end of the plate or film holder 16. A spring 33 is mounted across each window opening 15 and is adapted to firmly hold the plate or film holder in position across the window, as indicated in Fig. 5.

The front wall 11 of the camera is provided with a top overhanging portion or extension 37 and a bottom extension 38. The top extension 37 has a dual function. It provides additional room for the top plate holder 16. Its second function is to shield and protect the lens and shutter mechanism 12. The bottom extension 38 shields and protects the lens and shutter mechanism 12 and increases the bottom of the camera so that it may rest more securely on a supporting surface. The bottom of the camera is provided with the usual nipple 39 for a tripod. The door 18 is also provided with a similar threaded nipple 39 for a tripod so that the camera may be supported on the side. A carrying stray 49 is mounted on one side of the camera.

Figure 8:
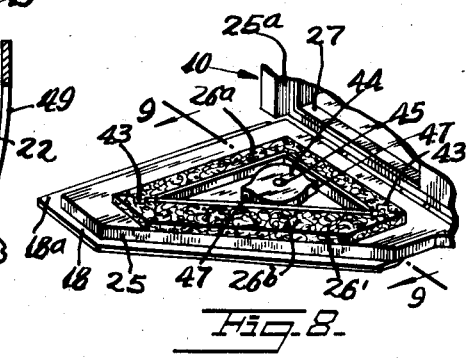
Fig. 8 is a fragmentary perspective view similar to a portion of Fig. 2 but illustrating a modified construction.
Figure 9:
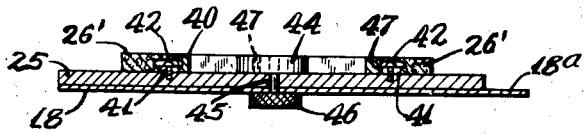
Fig. 9 is a sectional view taken on the line 9—9 of Fig. 8.

In Figs. 8 and 9 a modified form of the invention has been disclosed in which the light trap is constructed in a way so as to be safer, particularly when the camera becomes old. In accordance with this form of the invention the felt strips 26' are formed from a pair of adjacent strip sections 26a and 26b which are mounted on frames 40 of angle material movably mounted on the inner face of the door 18. Each frame 40 is formed with several slots 41 through which fastening elements 42 pass. The arrangement is such that the strips 26a and 26b may be moved away or towards each other a small distance as limited by the fastening elements 42 passing through the slots 41.

The adjacent ends of the strips 26a and 26b are formed with interengaging portions 43 which comprise projections on one of the parts engaging cutouts of the other of the parts. A cam 44 is located between the strips 26a and 26b, specifically, against the sides of the angle material members 40. This cam 44 is mounted on a turnable stem 45 which projects to the exterior of the door and is provided with a knob 46 by which it may be turned. The cam 44 has projecting portions 47 which are adapted to strike against the sides of the angle members 40 to cam the strips 26a and 26b outwards, that is, away from each other. In other respects this form of the invention is identical to the previous form and like parts are indicated by like reference numerals.

Normally, the cam 44 is in an inoperative position as illustrated in Fig. 8. The strips 26a and 26b are pressed together against the sides of the cam 44. The door 18 may then be closed in the usual way, and then the knob 46 may be turned to cause the projecting portions 47 of the cam 44 to press the felt strips 26a and 26b tightly against the cooperating shoulders 27. With this arrangement, even though the felt strips 26' become worn they may always be tightly engaged against the cooperating shoulders to keep the camera light proof.

When a picture is taken with the camera, the green filter 24 and the red filter reflector 19 function to make the top plate or film in the top holder 16, the green record negative, and the back plate or film in the back holder 16 the red record negative. The films are developed and a color print made in accordance with known processes.

It is to be understood that with this camera the usual one color photographs may also be taken by removing the reflector filter 19.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A light trap for a reflector filter multi-color plate camera having a box shaped housing formed with a side opening in one of its walls exposing the removable reflector filter of the camera to be removed through said opening and a pivotally mounted door for closing said side opening, said side wall having inwardly projecting shoulders surrounding said opening and engageable by the edge portions of the inner face of said door in the closed position thereof, and felt strips mounted on the inner face of said door and engaging the inner edges of said shoulders for light-proofing the contacting portions of said side wall and door, said felt strips being mounted on angle members, means slidably supporting said angle members on said door, and manually controllable means for urging said angle members outwards to engage said felt strips more rigidly against said shoulders.

2. A light trap for a reflector filter multi-color plate camera having a box shaped housing formed with a side opening in one of its walls exposing the removable reflector filter of the camera to be removed through said opening and a pivotally mounted door for closing said side opening, said side wall having inwardly projecting shoulders surrounding said opening and engageable by the edge portions of the inner face of said door in the closed position thereof, and felt strips mounted on the inner face of said door and engaging the inner edges of said shoulders for light-proofing the contacting portions of said side wall and door, said felt strips being mounted on angle members, means slidably supporting said angle members on said door, and manually controllable means for urging said angle members outwards to engage said felt strips more rigidly against said shoulders, said first means, comprising pins projecting from said door and engaging complementary slots formed in said angle members.

3. A light trap for a reflector filter multi-color plate camera having a box shaped housing formed with a side opening in one of its walls exposing the removable reflector filter of the camera to be removed through said opening and a pivotally mounted door for closing said side opening, said side wall having inwardly projecting shoulders surrounding said opening and engageable by the edge portions of the inner face of said door in the closed position thereof, and felt strips mounted on the inner face of said door and engaging the inner edges of said shoulders for lightproofing the contacting portions of said side wall and door, said felt strips being mounted on angle members, means slidably supporting said angle members on said door, and manually controllable means for urging said angle members outwards to engage said felt strips more rigidly against said shoulders, said latter means, comprising a cam engaging said angle members and mounted on a stem extending to the exterior of said door by which the cam may be manually turned in the closed position of said door.

ADOLPH SCHUSTERMAN.